United States Patent [19]

Thorsten

[11] 4,304,079
[45] Dec. 8, 1981

[54] FIRE RETARDANT MODULAR FLOOR PENETRATION STRUCTURE

[75] Inventor: Neal H. Thorsten, Lebanon, N.J.

[73] Assignee: Bell Telephone Laboratories, Incorporated, Murray Hill, N.J.

[21] Appl. No.: 111,358

[22] Filed: Jan. 11, 1980

[51] Int. Cl.$^3$ .......................... E04B 5/48; E04C 1/39
[52] U.S. Cl. ...................................... 52/221; 52/232; 52/227; 174/48
[58] Field of Search ............. 52/232, 220, 221, 303, 52/421, 477, 438, 21, 227–229, 584; 174/48, 49, 50, 101

[56] References Cited

U.S. PATENT DOCUMENTS

| | | | |
|---|---|---|---|
| 666,079 | 1/1901 | Wehling | 52/477 |
| 738,792 | 9/1903 | Gest | 52/220 |
| 901,833 | 10/1908 | Rettig | 52/421 |
| 1,028,578 | 6/1912 | Lund | 52/227 |
| 2,007,689 | 7/1935 | Merrill | 52/303 |
| 2,512,550 | 6/1950 | Pezzano | 52/584 |
| 3,976,825 | 8/1976 | Anderberg | 52/232 |
| 4,093,818 | 6/1978 | Thwaites et al. | 174/101 |

FOREIGN PATENT DOCUMENTS

| | | | |
|---|---|---|---|
| 218926 | 2/1910 | Fed. Rep. of Germany | 52/421 |
| 705027 | 4/1941 | Fed. Rep. of Germany | 52/423 |
| 919994 | 3/1947 | France | 174/50 |
| Ad.55167 | 10/1951 | France | 52/439 |
| 902650 | 8/1962 | United Kingdom | 52/21 |

Primary Examiner—James L. Ridgill, Jr.
Attorney, Agent, or Firm—A. G. Steinmetz

[57] ABSTRACT

A cable penetration matrix structure comprises a plurality of individual penetration cells ganged together to form a matrix. A sheath or shroud is added to each penetration cell in use to extend the length of the passageway. Each penetration cell is designed to permit cable passage therethrough in bundles and operates as a self-contained entity. Intumescent cards are inserted between layers of cable to provide a fire stopping seal. Each cell is opened for use as needed and unused cells may be tiled over as part of the floor. The cells are made of a cementitious material and may be reused in the event of a fire.

5 Claims, 13 Drawing Figures

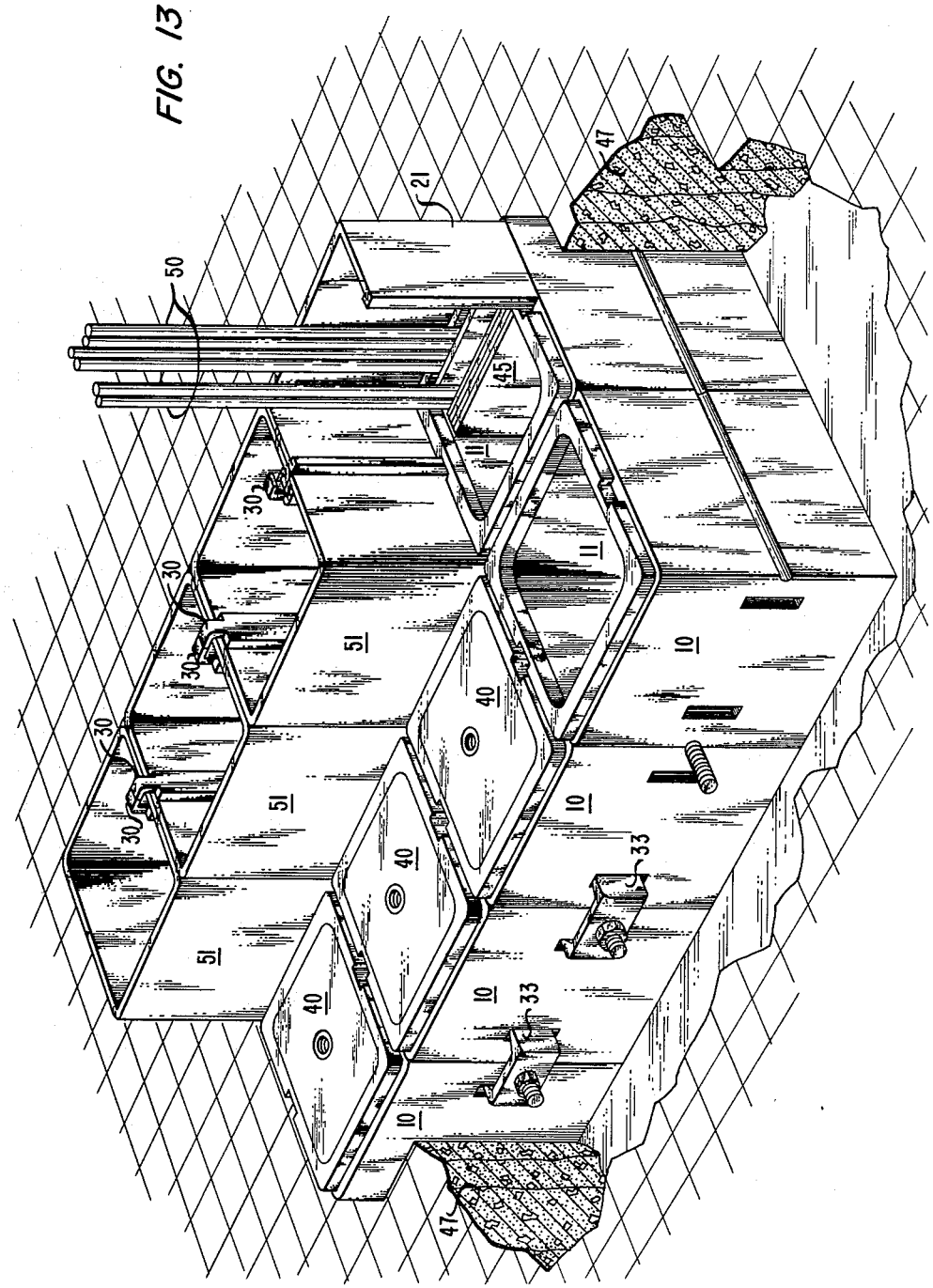

FIRE RETARDANT MODULAR FLOOR PENETRATION STRUCTURE

FIELD OF THE INVENTION

This invention is concerned with cable conduit structures having fire and smoke stopping properties and, more particularly, is concerned with a conduit arrangement for communication cabling with active fire, smoke, and gas seal capabilities.

BACKGROUND OF THE INVENTION

Fire safety is very important in business or commercial buildings. Methods of achieving fire safety include the proper selection of building materials and equipment with the objectives of preventing ignition of a fire, providing for the prompt detection of the occurrence of a fire and most importantly, designing the building to limit the impact of any fire that occurs. Limitation of a fire's impact is concerned with containing or limiting the spread of a fire and providing for quick extinguishment of a fire with minimal damage to the building and its equipment.

An excellent approach to the limitation of the impact of a fire is through proper design to provide containment to limit the spread of a fire. Containment is achieved through the use of fire stopping barriers which prevent the spread of the fire from one part of the building to another. Walls, for example, are a very effective barrier.

Modern business buildings, however, contain many conduits for electrical cabling which pass through otherwise effective barriers such as floors and walls. These conduits are usually continuous passageways and contain no effective fire stopping barriers. In particular, communication terminal buildings are especially prone to fires since they have many conduits to accommodate extensive cabling.

A fire phenomenon can be described in terms of several, well-defined sequential stages of a fire. The first stage of a fire is usually a smoldering condition. This condition subsequently passes to a second stage comprising an ignition condition and then continues to a third stage, namely, a full flame condition. These stages are often not simultaneously uniform over the entire building. A portion of the building may have a fire in a full flame condition while another part of the building, subjected to a heat energy transfer therefrom, including convective, conductive, and/or radiant energy interchanges may be in a preignition smoldering condition. It is apparent that a full flame fire in one section of a building, through this thermal energy interchange, may cause the start of a smoldering condition in another section of the building.

During this initial smoldering period, smoke and toxic gases are generated which may also travel via convection to other parts of the building unless effective barriers are used. The smoke and toxic gases generated by this smoldering action may cause very extensive damage through chemical reactions to communications equipment and even if the fire itself is suppressed, the damage caused by smoke and toxic gases may be quite extensive.

Standard cabling conduits presently used for communication and electrical cables readily permit the transfer of heat energy, smoke, and toxic gases. The transfer mechanism of convection is well-suited to the open passageway of a conduit which readily permits the spread of smoke and gas from one room to another. The nature of the cabling itself readily permits the conduction of heat energy along the copper core of the cable. This means that the heated copper core may cause smoldering of plastic insulation of the cable in a room otherwise insulated from a fire. This generates smoke and toxic gases which are very damaging to any sensitive electrical equipment contained in the room.

Prior art barrier techniques for cable conduits include the use of perforated barriers allowing the travel of cable from one side to another through individual perforations or holes. In other instances, the cables are transmitted through the conduit in bundles and bags of fireproof material which are stuffed about the cables at the egress point to provide an effective fire barrier. The first technique has limited versatility should the number of cables needed change. The second technique provides a fire seal, but in no way prevents the passage of toxic gases through the interstices of the cable bundle.

Certain desirable characteristics are necessary for a fire retardant conduit structure to be effective in reflecting the needs of fire protection in modern communication terminal buildings. A desirable fire retardant conduit structure should be cost effective. This means the cost of manufacture is low and the structure is easily installed at a low labor cost. The conduit structure should have a simple design and be easily adaptable to any size installation including adaptability to future cable number requirements. It should also be of solid construction which permits it to be repaired and reused after a fire and most importantly, effective at stopping a fire during every phase of the fire process.

BRIEF SUMMARY OF THE INVENTION

The invention described herein is embodied in a modular cable penetration structure comprising a plurality of self-contained entities called cells. Each entity or cell is a small individual cable conduit structure which permits cable passage therethrough in bundles through a floor or a wall. By permitting passage of cables in bundles, cabling through the conduit may be performed rapidly. Each cell is adapted so that it may be joined or ganged together with other cells to form a large matrix to provide any desired total cabling capacity. The original matrix, in a given building installation, may be designed with future needs in mind inasmuch as each cell may be plugged and tiled over as part of a floor or a wall. When capacity must be expanded, the tiles are removed and the newly exposed cells are unplugged as needed.

During cabling, the cables are passed through the open cell and a removable elastomeric material is placed about each cable to provide a smoke seal during the smoldering portion of the fire process. A plurality of intumescent cards designed to fit into the conduit portion of each cell are positioned between the layers and rows of the cables to provide full flame fire long-term protection. The intumescent cards expand upon application of heat and seal the passageway.

A sheath or shroud is placed on top of each cell which is used for cabling and functions to extend the conduit passageway above the level of the floor. The sheath is included to prevent the volatilization of cable insulation on the nonfire side of the floor due to the heat transmitted along the core of the cable. The sheath limits the air circulation among the cables thereby preventing oxidation and volatilization.

It is readily apparent that the aforedescribed modular cable penetration structure provides an effective fire seal during all phases of a fire. It furthermore exhibits a high degree of versatility, in the capacity of cabling it can handle, and permits advance planning to meet the needs of future cabling capacity.

BRIEF DESCRIPTION OF THE DRAWINGS

The principles of the invention may be readily understood by reference to the following description and the accompanying drawings in which:

FIG. 13 is an axonometric view of a ganged array of penetration structures installed in a slab concrete floor.

DETAILED DESCRIPTION

Figure 1:
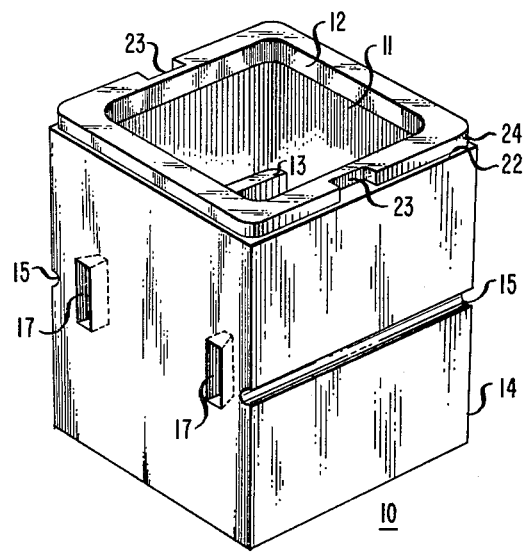
FIG. 1 is an axonometric drawing of a basic cable penetration cell.

The principles of the invention are embodied in a cable penetration structure in which several individual component parts are assembled at the construction site to form a complete penetration structure having unique and effective fire stopping properties. In describing the penetration structure module, the component parts are described first, followed by a description of a typical installation utilizing the module.

The two basic parts of the module are a cell and an associated shroud or sheath. The basic penetration cell of the module is disclosed in FIGS. 1, 2 and 3. In these and subsequent figures, each part and component described herein in different figures contain the same identical reference numeral for easy reference to different figures.

Figure 2:
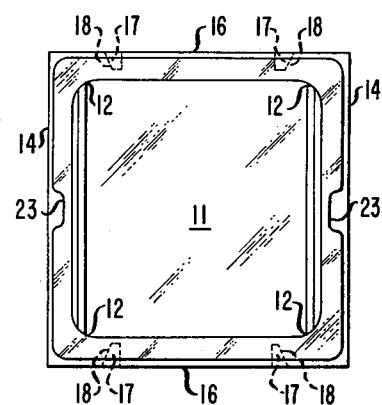
FIG. 2 is a top planar view of the penetration cell.

The basic building block, shown in FIG. 1; i.e., penetration cell 10, is capable of operating as a separate self-functioning entity. Cell 10 is a hollow conduit-like structure through which cables are passed from one room to another. As shown hereinbelow, cell 10 is cast into a concrete slab floor. It is to be understood that the same principles of construction and operation are applicable should cell 10 be cast in a wall. A penetration cell structure 10 is rectangular in shape and can be joined or ganged together into any size matrix desired. Two opposite outer sidewalls 14 have a semicircular slot 15 cut therethrough, which are each operative to permit a long stud to pass between two adjacent cells 10. On the remaining two outer sidewalls 16 of cell 10, are cut slots 17 that have a tapered side 18 adapted to receive clamps, described below (see FIG. 6), operative with the studs to secure adjacent cells 10 into a matrix as described below.

Cell 10 is preferably constituted of a cementitious material. This cementitious material should be fiber reinforced and selected so that cell 10 is capable of withstanding very high temperatures for extended periods of time.

The interior passageway 11 is rectangular in cross section with rounded corners 12 for prevention of fractures. Interior passageway 11 is tapered in its upper portion so that it may receive a removable plug 40 (see FIGS. 7, 8 and 9) which may have a corresponding taper. Plug 40 is inserted when cell 10 is not in use as a conduit. With plug 40 in place, cell 10 may be tiled over as part of the regular floor, ready for use at any future time simply by removing the tile. Ledge 13 is utilized to provide a support for intumescent cards 45 (see FIG. 10) which are inserted into the passageway between bundles of cable.

Figure 4:
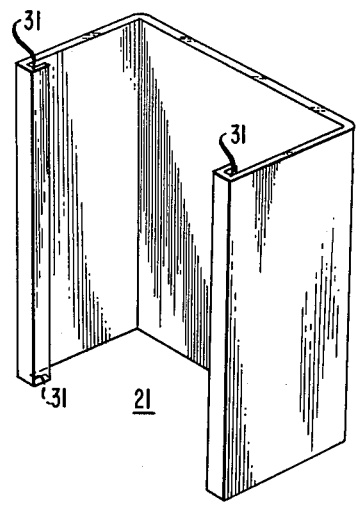
FIG. 4 is an axonometric view of a sheath component for the penetration cell.

Height 20 of cell 10 is selected to match the thickness of the concrete slab floor into which it is cast, so that the top surface of the cell and plug is flush with the plane surface of the floor. A sheath element 21 shown in FIG. 4 is designed to fit on top of cell 10. Two sheath elements 21 are joined to extend passageway 11 above the surface of the floor when cables are installed. Cell 10 is designed with a lip 22 near its top edge and a cutaway portion 23 on opposite sides of the lip to accept two sheath element halves 21 (see FIG. 4). Its joining clip 30 (see FIG. 5) is designed to hold the two element halves of the sheath or shroud together when they are assembled. When assembled, the cell and sheath form a unitary assembly. The sheath is detachable from cell 10 and if cell 10 is out of use, the sheath may be removed, plug 40 installed and cell 10 tiled over again.

There are two sheath elements 21 utilized per cell. A typical sheath element 21 is shown in FIG. 4. It is a metal shroudlike device shaped, as shown, to fit on top ledge 22 of cell 10 and is secured thereto by friction against shoulder 24. Sheath element 21 is constructed of sheet metal and is shaped as shown in FIG. 4. Bent loops 31 at the opposite ends engage with a spline clamp 30, shown in FIG. 5, to secure two sheath elements 21 together. When two sheath elements 21 are combined, they extend the passageway length of cell 10 to a substantial distance above the surface of the floor. The sheath is positioned in place only when cell 10 is actually cabled and in use. Sheath element 21, as discussed below, extends passageway 11 and assists in stopping damage due to heat conduction through the copper core of a communication cable, which may cause the cable insulation to smoulder.

Figure 5:
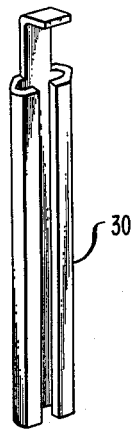
FIG. 5 is an axonometric view of a sheath spline clamp to secure the sheath to the cell.

Spline clamp 30 operative to secure two sheath elements 21 together is shown in FIG. 5. It is shaped to slide over the bent loop shape 31, formed at the ends of the metal sheath element 21. The spline clamp is designed to slide over and engage these two halves and hold two sheath elements 21 together as a unit. The joining of two sheath elements 21 together provides friction about ledge shoulder 24 of cell 10 adapted to receive the sheath and secures it to the cell. The operation of the spline clamp in the assembly will be readily apparent to those skilled in the mechanical arts from inspection of FIGS. 4, 5 and 13, and a detailed verbal description thereof is not necessary. A spline clamp 30 is shown in a final assembly view holding two sheath halves together in FIG. 13.

Figure 6:
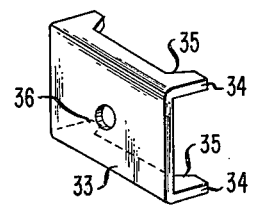
FIG. 6 is an axonometric view of a clamp to secure the penetration cells together in a matrix.

End clamp 33, shown in FIG. 6, is used in combination with a threaded rod to bridge adjacent cells and secures them together when a matrix of cells is constructed. End clamp 33 has four prongs 34, which are tapered on one side 35 to engage taper 18 in slot 17 molded in the sides of cell 10 (see FIG. 1). A threaded stud nested in slot 15 of adjacent cells 10 passes through a hole 36 in clamp 33. End clamps on opposite sides of the cell matrix to be secured are drawn together by tightening bolts on the stud. Ramps 35 of prongs 34 engage taper 18 of slots 17 and apply force drawing adjacent cells together. End clamp 33 maybe made of any suitable sheet metal. Appropriate sheet metals for this purpose are readily known to those skilled in the art.

Figure 7:
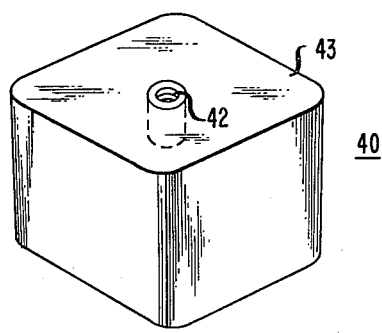
FIG. 7 is an axonometric view of a plug which closes the conduit or passageway of the cell.
Figure 8:
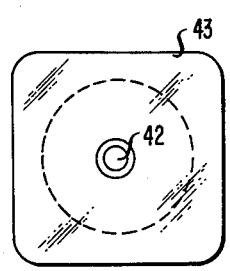
FIG. 8 is a top view of the plug.
Figure 9:
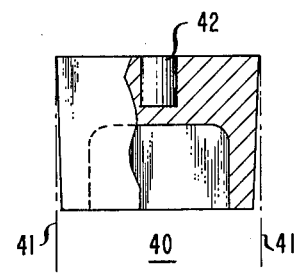
FIG. 9 is a side view of a partial cutaway of a plug.

Each cell 10, as described above, includes a plug 40, which is removable when the cell is put into use or cabled. A plug 40, suitable for this purpose, is shown in FIGS. 7, 8 and 9. This plug 40 may be tapered inward from vertical line 41, as shown in FIG. 9, to fit a matching taper in the top portion of passageway 11 of cell 10. Top surface 43 of plug 40 contains a threaded hole 42 to accept a screw to facilitate its removal from cell 10 when desired. The top surface of the combined cell 10 and plug 40, before removal, may be covered with a plastic sheet to prevent adhesion of floor tile cement when it is tiled over. This plastic sheet is pealed off when plug 40 is removed and cell 10 is used as a conduit. Cell 10 and plug 40 are both made of the same cementitious material. The bottom portion of the plug, as shown in a cutaway view in FIG. 9 is hollowed out for the purposes of weight reduction.

Figure 3:
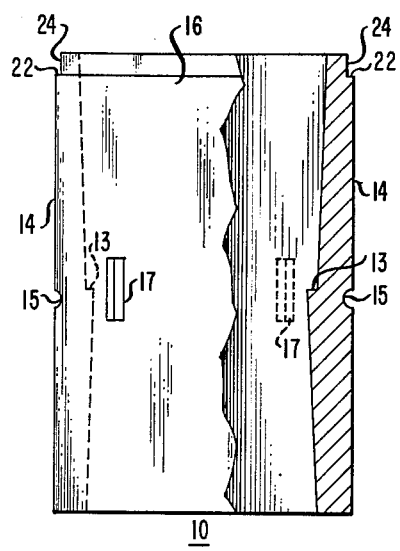
FIG. 3 is a side planar view of the penetration cell.
Figure 10:
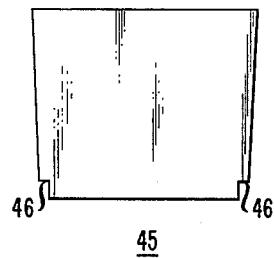
FIG. 10 is a side view of an intumescent card which is interleaved with layers of cable in the passageway of the penetration cell.

Intumescent cards 45, as shown in FIG. 10, are thin cards dimensionally designed to fit between linear rows or layers of cable which pass through the penetration cell and are held in place by a lower lip or edge 46 resting on a preformed ledge 13 in passageway 11 of cell 10 (see FIG. 3). These cards 45 are made of an inorganic intumescent material which expands significantly within a few minutes upon the application of heat or highly elevated temperatures. When expanded, this material seals all the interstices between the cables and completely closes passageway 11 of cell 10.

Figure 11:
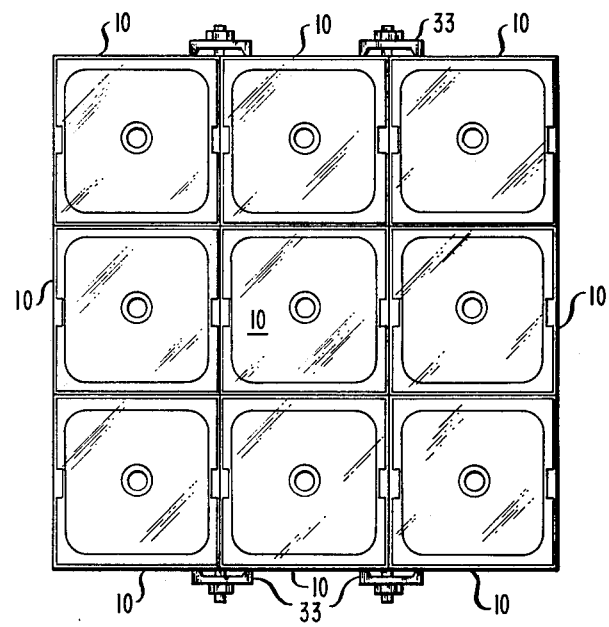
FIG. 11 is a top view of an assembly layout of a ganged array of individual penetration cells into a large matrix.

An arrangement of a matrix of individual penetration cells 10 to meet some predetermined cabling capacity is shown in FIG. 11. Individual cells 10 are ganged together to form a matrix and secured by studs and end clamps 33 as discussed above. This constructed matrix is then cast into a concrete slab floor as one complete unit. Unused penetration cells are tiled over as described above and only opened up as needed.

Figure 12:
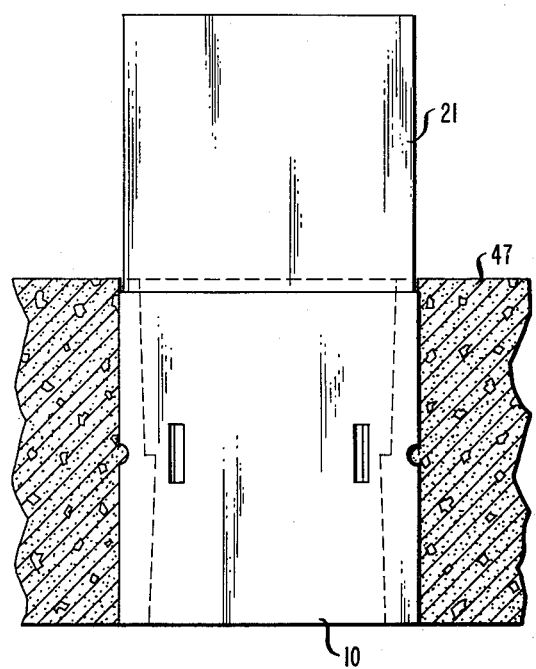
FIG. 12 is a side cutaway view of an installed penetration module structure in a concrete floor.

A side view of a complete penetration structure as installed and ready for use is shown in FIG. 12. Preferably, the height of cell 10 is the same as the thickness of the concrete floor slab into which it is cast. The sheath comprising two sheath elements 21 extends the passageway above the floor plane or level and is normally only added when the penetration cell is in use. The mass of concrete floor 47 in which cell 10 is cast assists in heat removal by providing a heat sink for heat passing the cores of cables in cell 10. While it is desirable that cell 10 have the same thickness as the concrete floor slab, it is not necessary. In cases where the floor is thinner or thicker then the cell thickness, the difference may be compensated for by judicious location of the cells. For example, if the floor thickness is less than the cell height, the cells will extend above the level of the floor. These cells may be placed where traffic does not pass through. On the other hand, if the cell height is less than the cast concrete floor slab thickness, the sheath may be placed on permanently before the cell is cast and again the cell with the sheath in place is placed in a location where there is no traffic.

A completely installed ganged matrix of penetration structures partially used and partially held in reserve is shown in FIG. 13. This axonometric view shows the individual cells of a large matrix, as cast into a concrete slab floor 47, in various stages of use. Views with the slab floor 47 cutaway show installed cells 10, both used and unused, with and without cables 50 passing through, and with and without sheaths or shrouds 51 installed. As described above, the penetration cell 10 is the basic building block. Each cell 10 is an individual conduit which permits cables to pass therethrough in bundles. Individual cells 10 are assembled or ganged together into a rectangular matrix which is cast during construction into the concrete slab of the building floor. Cell 10, as installed and cast into the concrete size floor, includes its tapered plug 40 in place. A plastic sheet on the top surface of the plug 40 and cell 10 allows tiling to be applied to the top surface of the cell. This sheet is removed when cell 10 is to be used and the plug removed. The plastic sheet prevents the adhesion of tile adhesive to the top surface of the cell.

When cell 10 is to be used, the metal sheath 51 is added to increase the length of the passageway. The sheath 51 is formed of two sheath elements 21 held together with spline clips 30, disclosed hereinabove. The extra passageway length above the surface of the floor, provided by metal sheath 51, prevents the oxidation of the polyvinylchlorine insulation of the cable above the floor level. This insulation, would normally, oxidize and generate smoke and toxic gases during the occasion of a fire below the slab floor which in turn would cause smoke and gas damage to equipment located above the floor, if it were unprotected.

Each cell 10 includes in its passageway 11 a ledge 13 on which the intumescent cards 45 inserted between the layers of the cable are set. These intumescent cards 45, when subjected to a high temperature, swell to fill all interstices and, hence, block the passage of flame, smoke and heat through the passageway.

The matrix of cells 10 is assembled before casting the slab floor and the total number of cells selected to be cast into the floor is determined by the expected future maximum capacity of cabling needed. The matrix is assembled by using end clamps 33 disclosed above and threaded rods to hold the cells together. End clamps 33 fit into slots 17 of adjacent cells and tightening the stud applies a force to draw the cells together. Since the sides of the cells may not be perfectly flat, a silicone rubber caulking bead may be placed between the cell walls to provide a seal as the cell walls are drawn together in the construction of the matrix.

In summary the whole matrix of cells is cast into the building floor during construction and the unused cells are tiled over and remain plugged until they are to be used. When cells 10 used, plug 40 is removed immediately. After plug 40 is removed, a single sheath element 21 is placed in position as shown. Cell 10 is then filled with cables 50 in some sequential fashion to form a cable bundle. After the cables are passed through the passageway, the intumescent cards 45 are inserted in between the layers of cables. In the case of a cell 10 being partially filled with cables, the unused portion of the cell passageway would be filled with an extra amount of intumescent cards 45.

During initial installation of the cables, a bead of high temperature sealing compound is wrapped around each of the cables to form a cold seal. The cold seal is necessary because the intumescent cards do not respond to the application of heat immediately but require some time to expand. When all the cables installed have a cold seal placed around them, the sheathing is completed by putting the second half of sheath element 21 on top of the cell and joining the two halves together with spline clips 30.

The cavity of sheath 51 is then filled with a pourable quick setting sealant. The cold smoke seal is provided by the beads and the quick setting sealant provides a cold smoke stop needed during the short time period it takes the intumescent cards 45 to expand.

The nature of the cell construction is such that in the event of a fire, damage to the cell is minimal. The cell may be cleaned and reused again without the need for new floor casting and new cell construction.

It is readily apparent that the penetration arrangement described herein provides many advantages such as ease of installation; inasmuch as, no special skills or tools are needed to install the cables or the cells, and the operation in installing cables can be done from one side of the penetration cell structure. The simplicity of design means that the component parts are very inexpensive and durable. Hence, the cells can be reused after a fire and with a complete matrix cast, the unused portion can be tiled over until needed for further cabling capacity. Many other arrangements will suggest themselves to those skilled in the art without departing from the spirit and scope of the invention disclosed herein.

I claim:

1. A cable conduit penetration structure comprising:
   a penetration cell (10) constructed of cementitious material so that it may be cast directly into a concrete floor, and including a cable passageway (11) of substantially rectangular cross section and oriented to provide cable passage from one side of the floor to another side, the cell and its passageway having a length substantially equal to a thickness of the floor into which it is cast, the cable passageway including two support ledges (13) cut into two and opposite sides of the passageway at a distance from one end of the passageway substantially equal to one half the length of the passageway, the support ledge being perpendicular to a direction of the length of the passageway, and
   the penetration cell further including at least two slots (17) cut into an exterior surface of one outer side wall (16) of the penetration cell to engage connecting clamps (33) whereby a plurality of penetration cells may be joined together, and a top surface of the cell being recessed around the periphery to form a shoulder (22,24)
   a metallic sheath (51) comprising first and second sheath elements (21) each having a channel-shaped cross section, the two sheath elements each including loops (31) bent in a hook shape along longitudinal edges of the channel-shaped cross section, and a spline clip (30) to engage the bent hook shapes of the two sheath elements when they are positioned together so that the longitudinal edges of the channel are abutted together and operative to secure the two sheath elements positively together and form the metallic sheath, the sheath being positioned on the shoulder to extend the length of the passageway through which the cables pass and having an interior periphery sized so that there is a pressure fit to secure it in place to the shoulder of the penetration cell, and
   a plurality of intumescent cards (45) inserted between layers of cables passing through the passageway and including cutaway lips (46) on opposite ends of the cards resting upon opposite ones of the two support ledges, respectively whereby the application of heat due to a fire causes material of the intumescent cards to expand into interstices between the cables and seal the passageway.

2. A penetration structure as defined in claim 1 wherein each of said slots includes a tapered side (18) and said clamp comprises four prongs (34), each prong having ramp sides (35) for engaging the tapered side of the slots for applying a force to draw two adjacent cells together and each cell further including semicircular slots (15) on two sides adjacent to sides including the slots whereby a hole is formed by semicircular slots of adjacent cells and a stud passing through the hole and engaging a clamp at each end of the stud and operative to secure two adjacent cells together.

3. A penetration structure as defined in claim 2 and further including a plug (40) to seal the passageway when it is not used for passage of the cables.

4. A cable penetration structure for providing a through passageway for cable bundles through a concrete floor structure (47),
   a penetration cell (10) constructed of cementitious material and cast into the concrete floor structure, a length of the penetration cell being substantially equal to a thickness of the concrete floor structure and the cell including a central passageway (11) of substantially rectangular cross section and oriented to permit a passage of cables through the floor structure,
   a support ledge (13) formed on two opposite sides of the passageway, a plurality of substantially rectangular intumescent cards (45) inserted between layers of cables and each card cutaway on the lower half so an edge (46) of the card rests upon the support ledge, and
   a sheath (51) comprising two substantially identical sheath elements (21) joined together and secured to a top of the cell to extend the length of the passageway,
   longitudinal edges of each sheath having shaped hooks (31) and a spline clip (30) to engage the hooks and secure edges together so the sheath may be added after cables and intumescent cards are in place.

5. A cable penetration structure as defined in claim 4 wherein each cell further includes connection slots (17) on an outer surface (16) of the cell for accepting connecting apparatus (33) to facilitate connection of the cell to a group of cells connected together in a matrix, and the clamping mechanism comprising a pronged clamp (33) with ramp edges (35), the ramp edge fitting into the connection slots (17) cut into the sidewalls (16) of the cells, the slots including a tapered side (18) to engage the ramp edge whereby the clamp is operative to apply force to join two adjacent cells together.

* * * * *